(12) United States Patent
Kollar et al.

(10) Patent No.: US 12,552,040 B2
(45) Date of Patent: Feb. 17, 2026

(54) SYSTEM AND METHOD FOR UNKNOWN OBJECT MANIPULATION FROM PURE SYNTHETIC STEREO DATA

(71) Applicant: TOYOTA RESEARCH INSTITUTE, INC., Los Altos, CA (US)

(72) Inventors: Thomas Kollar, San Jose, CA (US); Kevin Stone, Palo Alto, CA (US); Michael Laskey, Oakland, CA (US); Mark Edward Tjersland, Mountain View, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 782 days.

(21) Appl. No.: 17/839,193

(22) Filed: Jun. 13, 2022

(65) Prior Publication Data

US 2023/0398692 A1 Dec. 14, 2023

(51) Int. Cl.
*G06T 7/73* (2017.01)
*B25J 9/16* (2006.01)
(Continued)

(52) U.S. Cl.
CPC ........... *B25J 9/1697* (2013.01); *B25J 9/1661* (2013.01); *G06T 7/10* (2017.01); *G06T 7/73* (2017.01);
(Continued)

(58) Field of Classification Search
CPC ...... B25J 9/1697; B25J 9/1661; B25J 9/1612; G06T 7/10; G06T 7/73;
(Continued)

(56) References Cited

U.S. PATENT DOCUMENTS

| 7,164,117 B2 * | 1/2007 | Breed | G01S 7/417 250/221 |
| 8,140,358 B1 * | 3/2012 | Ling | G07C 5/008 340/439 |

(Continued)

FOREIGN PATENT DOCUMENTS

| WO | 2019125909 A1 | 6/2019 |
| WO | 2020088739 A1 | 5/2020 |
| WO | 2020102767 A1 | 5/2020 |

OTHER PUBLICATIONS

NPL Neural Disparity Refinement for Arbitrary Resolution (Year: 2021).*

(Continued)

*Primary Examiner* — Masud Ahmed
(74) *Attorney, Agent, or Firm* — SEYFARTH SHAW LLP

(57) ABSTRACT

A method for training a neural network to perform 3D object manipulation is described. The method includes extracting features from each image of a synthetic stereo pair of images. The method also includes generating a low-resolution disparity image based on the features extracted from each image of the synthetic stereo pair of images. The method further includes generating, by the neural network, a feature map based on the low-resolution disparity image and one of the synthetic stereo pair of images. The method also includes manipulating an unknown object perceived from the feature map according to a perception prediction from a prediction head.

20 Claims, 9 Drawing Sheets

(51) Int. Cl.
| | |
|---|---|
| *G06T 7/10* | (2017.01) |
| *G06V 10/77* | (2022.01) |
| *G06V 10/82* | (2022.01) |
| *H04N 13/128* | (2018.01) |
| *H04N 13/275* | (2018.01) |
| *H04N 13/00* | (2018.01) |

(52) U.S. Cl.
CPC .......... *G06V 10/7715* (2022.01); *G06V 10/82* (2022.01); *H04N 13/128* (2018.05); *H04N 13/275* (2018.05); *G06T 2207/10021* (2013.01); *G06T 2207/20081* (2013.01); *G06T 2207/20084* (2013.01); *G06T 2207/20228* (2013.01); *H04N 2013/0081* (2013.01); *H04N 2013/0092* (2013.01)

(58) Field of Classification Search
CPC . G06T 2207/10021; G06T 2207/20081; G06T 2207/20084; G06T 2207/20228; G06T 7/11; G06T 2207/10016; G06T 2207/20016; G06T 7/593; G06T 2207/10024; G06T 2207/10028; G06T 2207/20076; G06V 10/7715; G06V 10/82; G06V 10/454; G06V 10/774; G06V 20/64; H04N 13/128; H04N 13/275; H04N 2013/0081; H04N 2013/0092; G05B 2219/40264; G05B 2219/39271; G05B 2219/39484
See application file for complete search history.

(56) References Cited

U.S. PATENT DOCUMENTS

| | | | | |
|---|---|---|---|---|
| 9,305,411 | B2 * | 4/2016 | Ricci | B60R 25/102 |
| 12,026,905 | B2 * | 7/2024 | Rahnama | G06T 7/593 |
| 2020/0401136 | A1 * | 12/2020 | Iandola | G06F 18/2148 |
| 2021/0042575 | A1 * | 2/2021 | Firner | G06N 3/04 |
| 2021/0081724 | A1 * | 3/2021 | Ma | G06V 10/764 |
| 2023/0274453 | A1 * | 8/2023 | Tang | G06V 40/166 |
| | | | | 348/42 |

OTHER PUBLICATIONS

Kollar, et al., "SimNet: Enabling Robust Unknown Object Manipulation from Pure Synthetic Data via Stereo", 5th Conference on Robot Learning (CoRL 2021), Jun. 30, 2021, London UK.

Kollar, et al., "Enabling Real-World Object Manipulation with Sim-to-Real Transfer", Jul. 19, 2021. (https://medium.com/toyotaresearch/enabling-real-world-object-manipulationwith-sim-to-real-transfer-20d4962e029).

Laskey, et al., "SimNet: Enabling Robust Unknown Object Manipulation from Pure Synthetic Data via Stereo", Jun. 29, 2021. (https://sites.google.com/view/simnet-corl-2021).

* cited by examiner

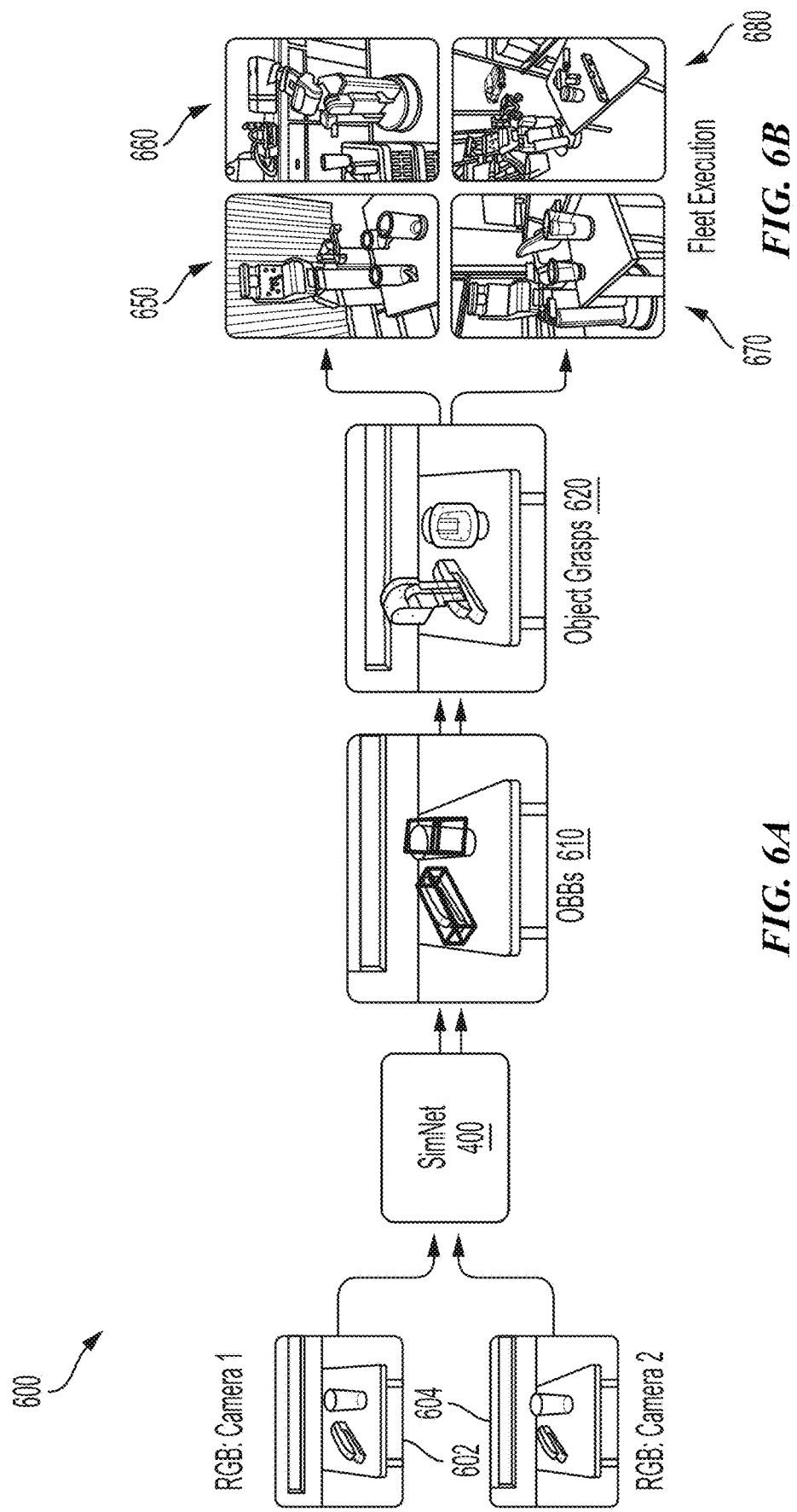

SYSTEM AND METHOD FOR UNKNOWN OBJECT MANIPULATION FROM PURE SYNTHETIC STEREO DATA

BACKGROUND

Field

Certain aspects of the present disclosure generally relate to machine learning and, more particularly, unknown object manipulation from pure synthetic stereo data.

Background

Autonomous agents (e.g., robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a video input based on annotations of automobiles within the scene. Unfortunately, annotating video is a challenging task involving deep understanding of visual scenes and extensive cost.

SUMMARY

A method for training a neural network to perform 3D object manipulation is described. The method includes extracting features from each image of a synthetic stereo pair of images. The method also includes generating a low-resolution disparity image based on the features extracted from each image of the synthetic stereo pair of images. The method further includes generating, by the neural network, a feature map based on the low-resolution disparity image and one of the synthetic stereo pair of images. The method also includes manipulating an unknown object perceived from the feature map according to a perception prediction from a prediction head.

A non-transitory computer-readable medium having program code recorded thereon for training a neural network to perform 3D object manipulation is described. The program code is executed by a processor. The non-transitory computer-readable medium includes program code to extract features from each image of a synthetic stereo pair of images. The non-transitory computer-readable medium also includes program code to generate a low-resolution disparity image based on the features extracted from each image of the synthetic stereo pair of images. The non-transitory computer-readable medium further includes program code to generate a feature map based on the low-resolution disparity image and one of the synthetic stereo pair of images using the neural network. The non-transitory computer-readable medium also includes program code to manipulate an unknown object perceived from the feature map according to a perception prediction from a prediction head.

A system for training a neural network to perform 3D object manipulation is described. The system includes a stereo feature extraction module to extract features from each image of a synthetic stereo pair of images. The system also includes a disparity image generation module to generate a low-resolution disparity image based on the features extracted from each image of the synthetic stereo pair of images. The system further includes a feature map generation module to generate a feature map based on the low-resolution disparity image and one of the synthetic stereo pair of images using the neural network. The system also includes a 3D object manipulation module to manipulate an unknown object perceived from the feature map according to a perception prediction from a prediction head.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 6A and 6B are block diagrams further illustrating operation of the 3D object manipulation architecture of FIG. 4, according to aspects of the present disclosure.

DETAILED DESCRIPTION

Figure 1:
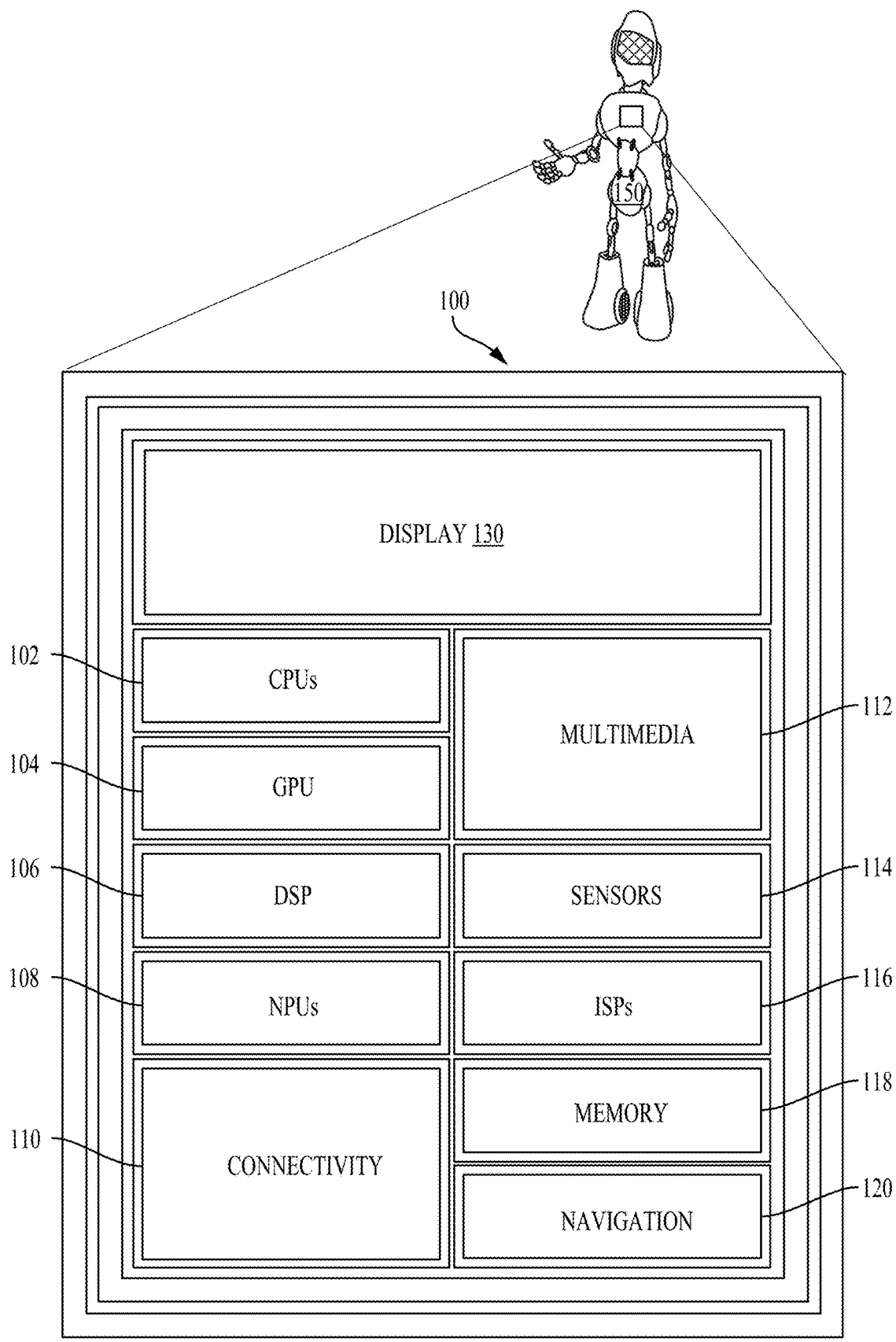
FIG. 1 illustrates an example implementation of designing a system using a system-on-a-chip (SOC) for 3D object manipulation from synthetic stereo data, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Deploying autonomous agents in diverse, unstructured environments involves robots that operate with robust and general behaviors. Enabling general behaviors in complex environments, such as a home, involves autonomous agents with the capability to perceive and manipulate previously unseen objects, such as new glass cups or t-shirts, even in the presence of variations in lighting, furniture, and objects. A promising approach to enable robust, generalized behaviors is to procedurally generate and automatically label large-scale datasets in simulation and use these datasets to train perception models.

Machine learning to train these autonomous agents often involves large labeled datasets to reach state-of-the-art performance. In the context of three-dimensional (3D) object detection for autonomous agents (e.g., robots and other robotics applications), 3D cuboids are one annotation type because they allow for proper reasoning over all nine degrees of freedom (three degrees of freedom for each instance of location, orientation, and metric extent). Unfortunately, acquiring enough labels to train 3D object detectors can be laborious and costly, as it mostly relies on a large number of human annotators. In addition, training methods for autonomous agents are strongly reliant on supervised training regimes. While they can provide for immediate learning of mappings from input to output, supervision involves large amounts of annotated datasets to accomplish the task. Unfortunately, acquiring these annotated datasets is laborious and costly. Additionally, the cost of annotating varies greatly with the annotation type because 2D bounding boxes are much cheaper and faster to annotate than, for example, instance segmentations or cuboids.

Perception models may be trained using simulated red-green-blue (RGB) data to extract the necessary representations for a wide variety of manipulation behaviors and can enable implementation of a manipulation policy using a classical planner. Nevertheless, perception models trained purely on simulated RGB data can over-fit to simulation artifacts, such as texture and lighting. In order to explicitly force models to focus on geometric features instead, models are often trained on active depth information. Unfortunately, active depth sensors use structured light, which struggles in environments where reflective and transparent objects are present. Natural home environments often have harsh lighting conditions and reflective or transparent objects such as glassware. The natural home environments motivate designing a method that is robust to these variations and can leverage geometric features without using depth sensors.

Some aspects of the present disclosure are directed to passive stereo matching as an alternative to active depth sensing, which captures images from two cameras and matches pixels in each image to a single point in 3D space. In these aspects of the present disclosure, a disparity (or horizontal difference in the pixel coordinates) of the single point can be directly mapped to depth. These aspects of the present disclosure rely on stereo vision to perform stereo matching for predicting depth images using a differentiable cost volume neural network that matches features in a pair of stereo images. Some aspects of the present disclosure focus on "low-level" features from approximate stereo matching to provide an intermediate representation for "high-level" vision tasks.

One aspect of the present disclosure is directed to a lightweight neural network model ("SimNet model") that leverages "low-level" vision features from a learned stereo network for "high-level" vision tasks. For example, the SimNet model may be trained entirely on simulated data to provide robust perception in challenging home environments. Some aspects of the present disclosure force the SimNet model to focus on geometric features using domain-randomized data. In these aspects of the present disclosure, the SimNet model learns to robustly predict representations used for manipulation of unknown objects in novel scenes by relying on a learned stereo network that is robust to diverse environments. For example, the SimNet model predicts a variety of "high-level" outputs, including segmentation masks, 3D oriented bounding boxes and keypoints. In contrast to conventional unknown object manipulation in novel environments, the SimNet model does not involve large-scale real data collection, active depth sensing, or photorealistic simulation.

FIG. 1 illustrates an example implementation of the aforementioned system and method for 3D object manipulation from synthetic stereo data using a system-on-a-chip (SOC) 100 of a robot 150. The SOC 100 may include a single processor or multi-core processors (e.g., a central processing unit), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a robot. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the robot 150. In this arrangement, the robot 150 may include a processor and other features of the SOC 100. In this aspect of the present disclosure, instructions loaded into a processor (e.g., CPU 102) or the NPU 108 of the robot 150 may include code for 3D auto-labeling with structural and physical constraints of objects within an image captured by the sensor processor 114. The instructions loaded into a processor (e.g., CPU 102) may also include code for planning and control (e.g., of the robot 150) in response to linking the 3D objects over time, creating smooth trajectories while respecting the road and physical boundaries from images captured by the sensor processor 114.

The instructions loaded into a processor (e.g., CPU 102) may also include code to extract features from each image of a synthetic stereo pair of images. The instructions loaded into a processor (e.g., CPU 102) may also include code to generate a low-resolution disparity image based on the features extracted from each image of the synthetic stereo pair of images. The instructions loaded into a processor (e.g., CPU 102) may further include code to generate a feature map based on the low-resolution disparity image and one of the synthetic stereo pair of images using a neural network. The instructions loaded into a processor (e.g., CPU 102) may also include code to manipulate an unknown object perceived from the feature map according to a perception prediction from a prediction head.

Figure 2:
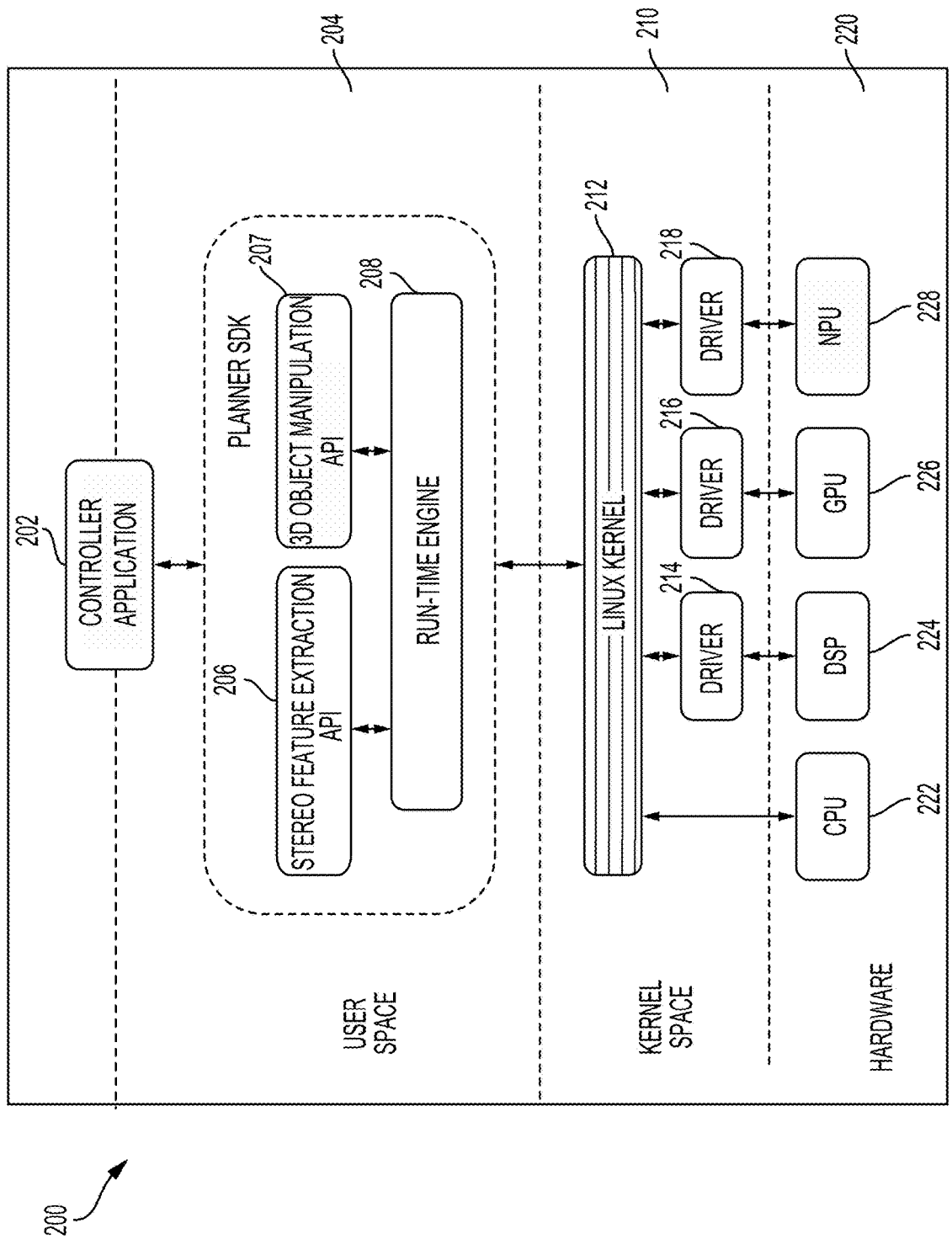
FIG. 2 is a block diagram illustrating a software architecture that may modularize functions for 3D object manipulation from synthetic stereo data, according to aspects of the present disclosure.

FIG. 2 is a block diagram illustrating a software architecture 200 that may modularize functions for planning and control of a robot using 3D object manipulation from synthetic stereo data, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202.

The controller application 202 may be configured to call functions defined in a user space 204 that may, for example, analyze a scene in a video captured by a monocular camera of a robot based on 3D perception of objects in the scene based on training using synthetic stereo data. In aspects of the present disclosure, 3D object manipulation of unknown objects detected in the video is improved by training a network using synthetic stereo data. The controller application 202 may make a request to compile program code associated with a library defined in a stereo feature extraction application programming interface (API) 206 to extract features from each image of a synthetic stereo pair of images. The stereo feature extraction API 206 may generate a feature map based on a low-resolution disparity image generated from the extracted features and one of the synthetic stereo pair of images using a neural network. In addition, a 3D object manipulation API may perform a 3D object manipulation prediction based on the feature map using a 3D object manipulation prediction head.

A run-time engine 208, which may be compiled code of a run-time framework, may be further accessible to the controller application 202. The controller application 202 may cause the run-time engine 208, for example, to perform 3D object manipulation from synthetic stereo data. When an object is detected within a predetermined distance of the robot, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
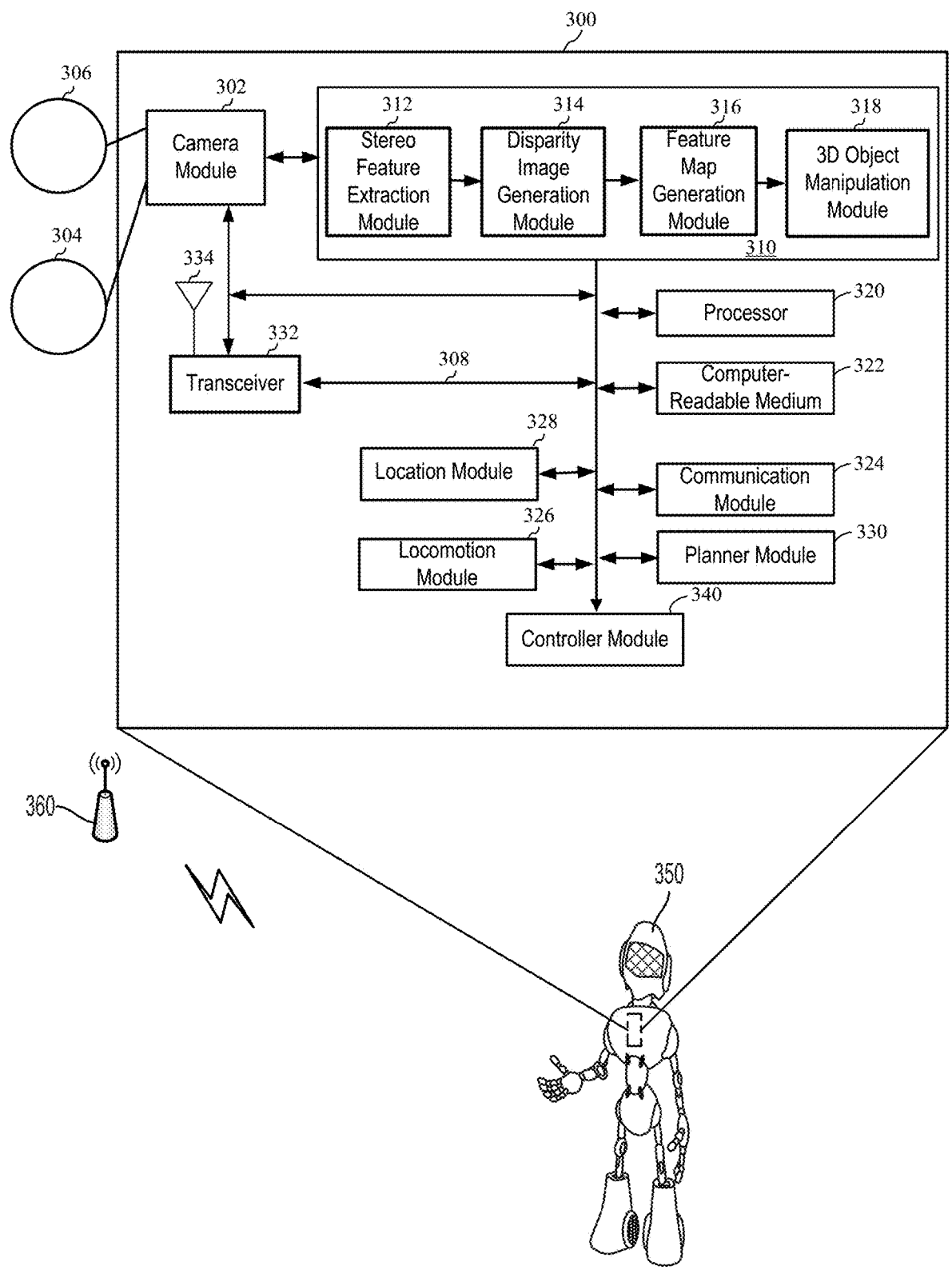
FIG. 3 is a diagram illustrating an example of a hardware implementation for a 3D object manipulation system from synthetic stereo data, according to aspects of the present disclosure.

FIG. 3 is a diagram illustrating an example of a hardware implementation for a 3D object manipulation system 300 trained using synthetic stereo data, according to aspects of the present disclosure. The 3D object manipulation system 300 may be configured for understanding a scene to enable planning and controlling a robot in response to images from video captured through a camera during operation of a robot 350. The 3D object manipulation system 300 may be a component of a robotic or other autonomous device. For example, as shown in FIG. 3, the 3D object manipulation system 300 is a component of the robot 350. Aspects of the present disclosure are not limited to the 3D object manipulation system 300 being a component of the robot 350, as other devices, such as a vehicle, a bus, a motorcycle, or other like autonomous vehicles, are also contemplated for using the 3D object manipulation system 300. The robot 350 may be autonomous or semi-autonomous.

The 3D object manipulation system 300 may be implemented with an interconnected architecture, represented generally by an interconnect 308. The interconnect 308 may include any number of point-to-point interconnects, buses, and/or bridges depending on the specific application of the 3D object manipulation system 300 and the overall design constraints of the robot 350. The interconnect 308 links together various circuits, including one or more processors and/or hardware modules, represented by a camera module 302, a robot perception module 310, a processor 320, a computer-readable medium 322, a communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The 3D object manipulation system 300 includes a transceiver 332 coupled to the camera module 302, the robot perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the robot 350. As another example, the transceiver 332 may transmit auto-labeled 3D objects within a video and/or planned actions from the robot perception module 310 to a server (not shown).

The 3D object manipulation system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the 3D object manipulation system 300 to perform the various functions described for robotic perception of objects in scenes based on oriented bounding boxes (OBB) labeled within video captured by a camera of an autonomous agent, such as the robot 350, or any of the modules (e.g., 302, 310, 324, 326, 328, 330, and/or 340). The computer-readable medium 322 may also be used for storing data that is manipulated by the processor 320 when executing the software.

The camera module 302 may obtain images via different cameras, such as a first camera 304 and a second camera 306. The first camera 304 and the second camera 306 may be a vision sensors (e.g., a stereoscopic camera or a red-green-blue (RGB) camera) for capturing 2D RGB images. Alternatively, the camera module may be coupled to a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first camera 304 or the second camera 306.

The images of the first camera 304 and/or the second camera 306 may be processed by the processor 320, the camera module 302, the robot perception module 310, the communication module 324, the locomotion module 326, the location module 328, and the controller module 340. In conjunction with the computer-readable medium 322, the images from the first camera 304 and/or the second camera 306 are processed to implement the functionality described herein. In one configuration, detected 3D object information captured by the first camera 304 and/or the second camera 306 may be transmitted via the transceiver 332. The first camera 304 and the second camera 306 may be coupled to the robot 350 or may be in communication with the robot 350.

Understanding a scene from a video input based on oriented bounding box (OBB) labeling of 3D objects within a scene is an important perception task in the area of autonomous agents, such as the robot 350. Some aspects of the present disclosure are directed to passive stereo matching as an alternative to active depth sensing, which captures images from two cameras and matches pixels in each image to a single point in 3D space. In these aspects of the present disclosure, a disparity (or horizontal difference in the pixel coordinates) of the single point can be directly mapped to depth. These aspects of the present disclosure rely on stereo vision to perform stereo matching for predicting depth images using a differentiable cost volume neural network that matches features in a pair of stereo images. Some aspects of the present disclosure focuses on "low-level" features from approximate stereo matching to provide an intermediate representation for "high-level" vision tasks.

The location module 328 may determine a location of the robot 350. For example, the location module 328 may use a global positioning system (GPS) to determine the location of the robot 350. The location module 328 may implement a dedicated short-range communication (DSRC)-compliant GPS unit. A DSRC-compliant GPS unit includes hardware and software to make the robot 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the robot 350 with space-level accuracy for accurately directing the robot 350 to a desired location. For example, the robot 350 is moving to a predetermined location and desires partial sensor data. Space-level accuracy means the location of the robot 350 is described by the GPS data sufficient to confirm a location of the robot 350 parking space. That is, the location of the robot 350 is accurately determined with space-level accuracy based on the GPS data from the robot 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the robot 350 that are not modules of the 3D object manipulation system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The 3D object manipulation system 300 also includes the planner module 330 for planning a selected trajectory to perform a route/action (e.g., collision avoidance) of the robot 350 and the controller module 340 to control the locomotion of the robot 350. The controller module 340 may perform the selected action via the locomotion module 326 for autonomous operation of the robot 350 along, for example, a selected route. In one configuration, the planner module 330 and the controller module 340 may collectively override a user input when the user input is expected (e.g., predicted) to cause a collision according to an autonomous level of the robot 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous agents (e.g., Level 0, Level 1, Level 2, Level 3, Level 4, and Level 5). For example, if an autonomous agent has a higher level number than another autonomous agent (e.g., Level 3 is a higher level number than Levels 2 or 1), then the autonomous agent with a higher level number offers a greater combination and quantity of autonomous features relative to the agent with the lower level number. These different levels of autonomous agents are described briefly below.

Level 0: In a Level 0 agent, the set of advanced driver assistance system (ADAS) features installed in an agent provide no agent control, but may issue warnings to the driver of the agent. An agent which is Level 0 is not an autonomous or semi-autonomous agent.

Level 1: In a Level 1 agent, the driver is ready to take operation control of the autonomous agent at any time. The set of ADAS features installed in the autonomous agent may provide autonomous features such as: adaptive cruise control (ACC); parking assistance with automated steering; and lane keeping assistance (LKA) type II, in any combination.

Level 2: In a Level 2 agent, the driver is obliged to detect objects and events in the roadway environment and respond if the set of ADAS features installed in the autonomous agent fail to respond properly (based on the driver's subjective judgement). The set of ADAS features installed in the autonomous agent may include accelerating, braking, and steering. In a Level 2 agent, the set of ADAS features installed in the autonomous agent can deactivate immediately upon takeover by the driver.

Level 3: In a Level 3 ADAS agent, within known, limited environments (such as freeways), the driver can safely turn their attention away from operation tasks, but must still be prepared to take control of the autonomous agent when needed.

Level 4: In a Level 4 agent, the set of ADAS features installed in the autonomous agent can control the autonomous agent in all but a few environments, such as severe weather. The driver of the Level 4 agent enables the automated system (which is comprised of the set of ADAS features installed in the agent) only when it is safe to do so. When the automated Level 4 agent is enabled, driver attention is not required for the autonomous agent to operate safely and consistent within accepted norms.

Level 5: In a Level 5 agent, other than setting the destination and starting the system, no human intervention is involved. The automated system can drive to any location where it is legal to drive and make its own decision (which may vary based on the jurisdiction where the agent is located).

A highly autonomous agent (HAA) is an autonomous agent that is Level 3 or higher. Accordingly, in some configurations the robot 350 is one of the following: a Level 0 non-autonomous agent; a Level 1 autonomous agent; a Level 2 autonomous agent; a Level 3 autonomous agent; a Level 4 autonomous agent; a Level 5 autonomous agent; and an HAA.

The robot perception module 310 may be in communication with the camera module 302, the processor 320, the computer-readable medium 322, the communication module 324, the locomotion module 326, the location module 328, the planner module 330, the transceiver 332, and the controller module 340. In one configuration, the robot perception module 310 receives sensor data from the camera module 302. The camera module 302 may receive RGB video image data from the first camera 304 and the second camera 306. According to aspects of the present disclosure, the robot perception module 310 may receive RGB video image data directly from the first camera 304 or the second camera 306 to perform oriented bounding box (OBB) labeling of unknown objects from images captured by the first camera 304 and the second camera 306 of the robot 350.

As shown in FIG. 3, the robot perception module 310 includes a stereo feature extraction module 312, a disparity image generation module 314, a feature map generation module 316, and a 3D object manipulation module 318 (e.g., based on oriented bounding boxes). The stereo feature extraction module 312, the disparity image generation module 314, the feature map generation module 316, and the 3D object manipulation module 318 may be components of a same or different artificial neural network, such as a convolutional neural network (CNN). The modules (e.g., 312, 314, 316, 318) of the robot perception module 310 are not limited to a convolutional neural network. In operation, the robot perception module 310 receives a video stream from the first camera 304 and the second camera 306. The video stream may include a 2D RGB left image from the first camera 304 and a 2D RGB right image from the second camera 306 to provide a stereo pair of video frame images. The video stream may include multiple frames, such as image frames.

In some aspects of the present disclosure, the robot perception module 310 is configured to understand a scene from a video input (e.g., the camera module 302) based on oriented bounding boxes (OBBs) describing objects within a scene as a perception task during autonomous operation of the robot 350. Aspects of the present disclosure are directed to a method for 3D object manipulation including extracting, by the stereo feature extraction module 312, features from each image of a synthetic stereo pair of images. Prior to feature extraction, the robot perception module 310 may generate non-photorealistic simulation graphics for which the synthetic stereo pair of images are generated. In aspects of the present disclosure, a left image and a right image are provided as the synthetic stereo pair of images for the stereo feature extraction module 312. Once extracted, the disparity image generation module 314 generates a low-resolution disparity image based on the features extracted from each image of the synthetic stereo pair of images.

In some aspects of the present disclosure, this portion of the 3D object manipulation method involves training of a neural network to rely on stereo vision for performing stereo matching to predict depth images using a differentiable cost volume (DCVS) neural network that matches features in a pair of stereo images. In these aspects of the present disclosure, the trained DCVS neural network focuses on "low-level" features from approximate stereo matching to provide an intermediate representation for "high-level" vision tasks. For example, the feature map generation module 316 generates a feature map based on the low-resolution disparity image and one of the synthetic stereo pair of images using a trained neural network. In response, the 3D object manipulation module 318 manipulates an unknown object perceived from the feature map according to a perception prediction from a prediction head, for example, as shown in FIG. 4.

Enabling Predictions for Manipulation from Synthetic Stereo

In some aspects of the present disclosure, a 3D object manipulation architecture leverages approximate stereo matching techniques and domain randomization to predict segmentation masks, oriented bounding boxes (OBBs), and keypoints on unseen objects for performing vision tasks (e.g., robot manipulation). Some aspects of the present disclosure recognize that robust "low-level" features like disparity can be learned by training using approximate stereo matching algorithms on pure synthetic data for enabling sim-to-real transfer on "high-level" vision tasks. These aspects of the present disclosure involve learning robust "low-level" features, which are then used for "high-level" perception. These aspects of the present disclosure rely on generation of low-cost synthetic data for an overall network architecture, for example, as shown in FIG. 4.

Figure 4:
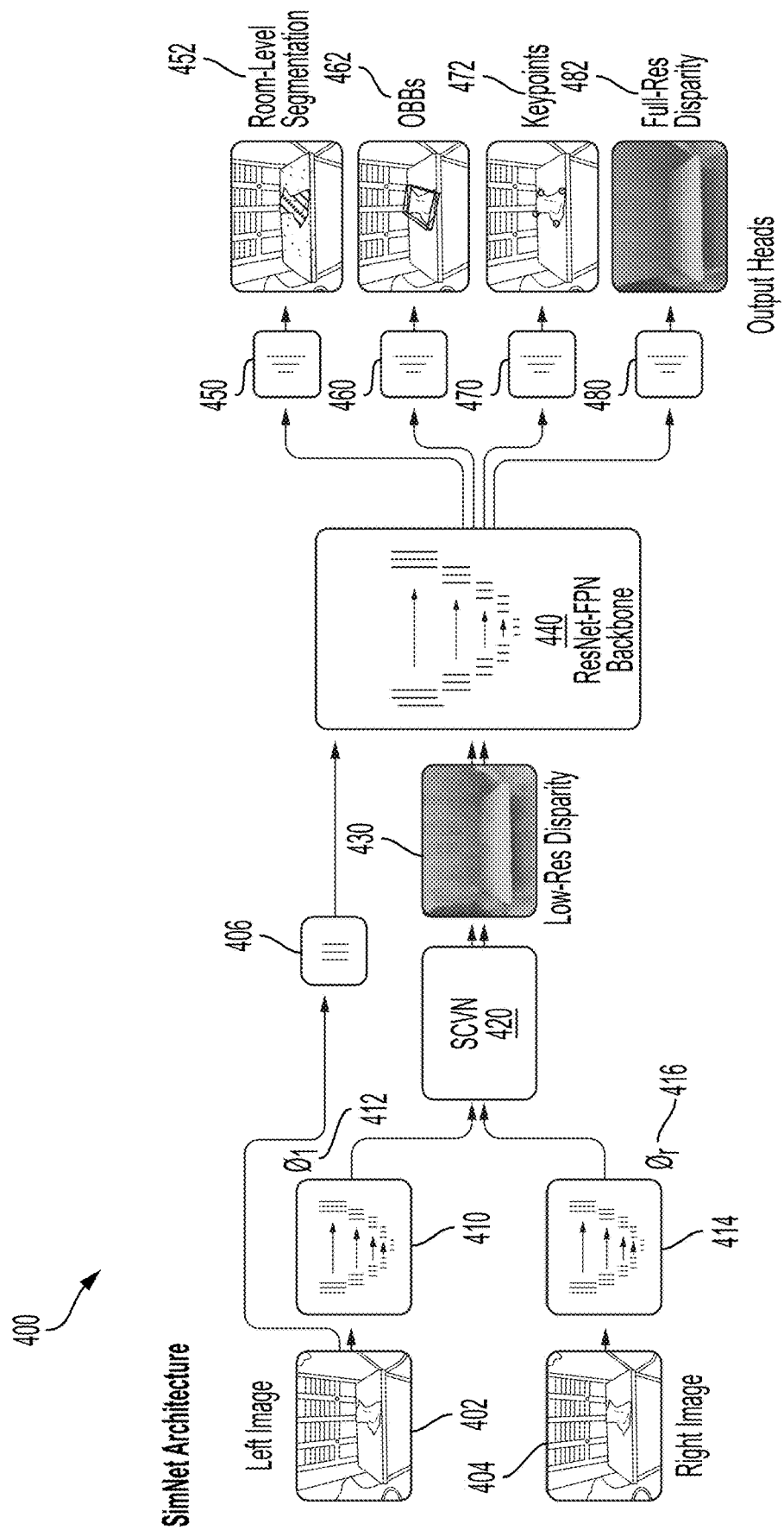
FIG. 4 is a block diagram of a 3D object manipulation architecture for the 3D object manipulation system of FIG. 3, according to aspects of the present disclosure.

FIG. 4 is a block diagram of a 3D object manipulation architecture for the 3D object manipulation system 300 of FIG. 3, according to aspects of the present disclosure. FIG. 4 illustrates a 3D object manipulation architecture 400, which may be referred to as a simulation network (e.g., "SimNet"), and configured to enable perception models trained on simulated data to transfer to real-world scenes. In the 3D object manipulation architecture 400, a left stereo RGB image 402 and a right stereo RGB image 404 are fed into a left feature extractor 410 and a right feature extractor 414. Prior to feature extraction, low-cost, non-photorealistic simulation graphics are used for generating the synthetic stereo pair of images (e.g., the left stereo RGB image 402 and the right stereo RGB image 404).

In some aspects of the present disclosure, the left feature extractor 410 and the right feature extractor 414 are implemented using neural networks (e.g., $\Phi_l$ and $\Phi_r$) trained to identify features of each image and output feature volumes $\phi_l$ 412 and $\phi_r$ 416. Once generated, the output feature volumes $\phi_l$ 412 and $\phi_r$ 416 are fed into a stereo cost volume network (SCVN) 420, which performs approximate stereo matching between output feature volumes $\phi_l$ 412 and $\phi_r$ 416. The output of the SCVN 420 is a low-resolution disparity image 430. In this configuration, the low-resolution disparity image 430 is fed in with features extracted from the left stereo RGB image 402 (e.g., by a feature extractor 406) to a feature extraction backbone 440 (e.g., a residual neural network (ResNet) feature pyramid network (FPN) backbone) and output prediction heads (e.g., 450, 460, 470, and 480). In this example, the output heads (e.g., 450, 460, 470, and 480) output the room-level segmentation 452, the predicted OBBs 462, the predicted keypoints 472, and the full-resolution disparity image 482.

Stereo Cost Volume Networks (SCVN) for Robust Low-Level Features

As shown in FIG. 4, the SCVN 420 performs learned stereo matching to generate the low-resolution disparity image 430 as follows. Let ⊙ denote Hadamard products, and $I_{[i,j:k,:]}$ denote the selection of all elements with index I in the first dimension of tensor I, index in {j, ... k−1} in the second dimension of I, and any index in the third dimension onwards. Let $I_l$ and $I_r$ denote the left stereo RGB image 402 and the right stereo RGB image 404 from the input stereo pair of images. Each image has the dimension $3 \times H_0 \times W_0$. The left stereo RGB image 402 and the right stereo RGB image 404 are fed into neural networks $\Phi_l$ and $\Phi_r$ of the left feature extractor 410 and the right feature extractor 414 that featurize each image, respectively, and output feature volumes $\phi_l$ 412 and $\phi_r$ 416. Both the output feature volumes $\phi_l$ 412 and $\phi_r$ 416 may have the dimension $C_\phi \times H_\phi \times W_\phi$, where $C_\phi$ is the number of channels in each feature volume, and $H_\phi$ and $W_\phi$ are their height and width, respectively. Some aspects of the present disclosure implement the left feature extractor 410 and the right feature extractor 414 using a lightweight Dilated ResNet-FPN as the feature extractor, to enable large receptive fields with a minimal amount of convolutional layers.

In this aspect of the present disclosure, the extracted features of the output feature volumes $\phi_l$ 412 and $\phi_r$ 416 are fed into the SCVN 420 (e.g., $f_{cost}$). The SCVN 420 may be composed of an approximate stereo matching module that searches horizontally in the output feature volumes $\phi_l$ 412 and $\phi_r$ 416 for correspondences within an allowed disparity range. For example, correspondences across the left stereo RGB image 402 and the right stereo RGB image 404 can be found by searching along a horizontal line across the images for a match, and the disparity (e.g., the low-resolution disparity image 430) is the difference in the x coordinates in the match, which is high for closer points in 3D space and low for farther points. The architecture of the SCVN 420 (e.g., $f_{cost}$) approximately performs this search to generate the low-resolution disparity image 430. The first phase of the SCVN 420 (e.g., $f_{cost}^{(0)}$) computes pixel-wise dot products between horizontally shifted versions of the output feature volumes c 412 and $\phi_r$ 416. The output of this phase has the dimension $C_c \times H_\phi \times W_\phi$. The value $2*(C_c-1)$ represents the maximum disparity considered by the SCVN 420, and the minimum disparity considered is 0. The i-th $H_c \times W_c$ slice of the output is computed as:

$$f_{cost}^{(0)}(\phi_l, \phi_r)_{[i,:,:]} = \sum_{j=0}^{C-1} (\phi_{l,[i,:,:]} \odot \phi_{r,[i,:,:W-1]})_{[j]}; f_{cost}^{(0)}(\phi_l, \phi_r)_{[i,:,:]} = 0$$

In this aspect of the present disclosure, the first case takes the rightmost $H_c-i$ columns of the left feature volume $\phi_l$ 412 and computes a pixel-wise dot product with the leftmost $H_c-i$ columns of the right feature volume $\phi_r$ 416. This operation horizontally searches for matches across the output feature volumes $\phi_l$ 412 and $\phi_r$ 416 at a disparity of 2i. The next phase of the SCVN 420 (e.g., $f_{cost}^{(0)}$) feeds the resulting volume into a sequence of ResNet blocks, which outputs a volume of dimension $C_c \times H_\phi \times W_\phi$ before performing a soft argmin along the first axis of the volume. The soft argmin operation approximately finds the disparity for each pixel by locating its best match. The final volume is an estimate of a low-resolution disparity image $\hat{I}_{d,low}$ with $H_\phi \times W_\phi$. The SCVN 420 is denoted as $f_{cost} = f_{cost}^{(1)} \circ f_{cost}^{(0)}$.

Disparity Auxiliary Loss In addition to the losses for the high-level perception heads (e.g., the OBBs output prediction head 460 and the keypoint prediction head 470), the weights of $\Phi_l$, $\Phi_r$, and $f_{cost}$ are trained by minimizing an auxiliary depth reconstruction loss function. In particular, the loss function takes in a target disparity image $I_{targ,d}$ of dimension $H_0 \times W_0$, downsamples it by a factor of $H_0/H_\phi$ and then computes the Huber loss $\ell_{d,small}$ of it with the low-resolution depth prediction $f_{cost}(\phi_l, \phi_r)$ That is, the network weights of the SCVN 420 are trained to minimize $\ell_{d,small}$ ($f_{cost}(\phi_l, \phi_r)$, downsample ($I_{targ,d}$, $H_0/H_\phi$)).

Extracting High-Level Predictions for Manipulation Tasks

As shown in FIG. 4, the SCVN 420 is configured to extract geometric features from the left stereo RGB image 402 and the right stereo RGB image 404 to form the low-resolution disparity image 430. Some aspects of the present disclosure learn high-level predictions relevant to vision task (e.g., object detection/manipulation). These aspects of the present disclosure design a backbone for robust simulation-trained manipulation by feeding the output of the SCVN 420 (e.g., the low-resolution disparity image 430 ($\hat{I}_{d,low}$) into the feature extraction backbone 440 (e.g., a residual neural network (ResNet) feature pyramid network (FPN) backbone ($f_{backbone}$) Additionally, early stage features provided by the feature extractor 406 from the left stereo RGB image 402, $I_1$, allow high resolution texture information to be considered at inference time. The features are extracted from the ResNet stem, concatenated with the low-resolution disparity image 430 output of the SCVN 420, and fed into the feature extraction backbone 440. The output of the feature extraction backbone 440 is fed into each of the output prediction heads (e.g., 450, 460, 470, 480).

The following sections describes how the 3D object manipulation architecture 400 uses the output of the feature extraction backbone 440 for the output prediction heads and the losses used for training the 3D object manipulation architecture 400. The optional auxiliary prediction heads (e.g., the room-level segmentation prediction head 450 and the full-resolution disparity prediction head 480) are also described. In some aspects of the present disclosure, the output prediction heads use an up-scaling branch, which aggregates different resolutions across the feature extractor.

In aspects of the present disclosure, the output heads of the 3D object manipulation architecture 400 include an OBBs output prediction head 460. In these aspects of the present disclosure, the OBBs output prediction head 460 outputs the predicted OBBs 462 of an image frame. Detection of the OBBs may involve determining individual object instances as well as estimating translation, $t \in \mathbb{R}^3$, scale $S \in \mathbb{R}^{3\times 3}$, and rotation, $R \in \mathbb{R}^{3\times 3}$, of the predicted OBBs 462. These parameters can be recovered by using the four different output heads of the 3D object manipulation architecture 400. First, to recover object instances, a $W_0 \times H_0$ image is regressed, which is the resolution of the left stereo RGB image 402, and a Gaussian heatmap is predicted for each object in the $W_0 \times H_0$ image. Instances can then be derived using peak detection. In addition, an $L_1$ loss is used on the OBBs output prediction head 460, which denoted the loss as $l_{inst}$.

Given instances of object, the remaining 9-DOF pose parameters can be regressed. To recover scale and translation, a $W_0/8 \times H_0/8 \times 16$ output head is first regressed, in which each element contains pixel-wise offset from detected peak to the 8 box vertices projected on to the image. Scale and translation of the box can be recovered up to a scale ambiguity using, for example, efficient perspective-n-point (EPnP) camera pose estimation. In contrast with convention pose estimation, the predicted OBBs 462 are aligned based on principal axes sized in a fixed reference frame. To recover absolute scale and translation, the distance from the camera $z \in \mathbb{R}$ of the box centroid is regressed as a $W_0/8 \times H_0/8$ tensor. The two losses on these tensors are an $L_1$ loss and are denoted $l_{vrt}$ and $l_{cent}$.

Finally, the rotation of the predicted OBBs 462, R, can be recovered via directly predicting the covariance matrix, $\Sigma \in \mathbb{R}^{3\times 3}$ of the ground truth 3D point cloud of the target object, which can be easily generated in simulation. The output tensor of $W_0/8 \times H_0/8 \times 6$ is directly regressed, where each pixel contains both the diagonal and symmetric off diagonal elements of the target covariance matrix. Rotation can then be recovered based on the SVD of $\Sigma$. L1 loss on this output head is used and denoted as $l_{cov}$. Note that for the 9-DOF pose losses, the loss is only enforced when the Gaussian heatmaps have scored greater than 0.3 to prevent ambiguity in empty space.

Finally, the rotation of the OBB, R, can be recovered via directly predicting the covariance matrix, $\Sigma \in \mathbb{R}^{3\times 3}$ of the ground truth 3D point cloud of the target object, which can be easily generated in simulation. The output tensor of $W_0/8 \times H_0/8 \times 6$ is directly regressed, where each pixel contains both the diagonal and symmetric off diagonal elements of the target covariance matrix. Rotation can then be recovered based on the singular value decomposition (SVD) of $\Sigma$. L1 loss on the OBBs output prediction head 460 is used and denoted as $l_{cov}$. It should be noted that for the 9-DOF pose losses, the loss is enforced when the Gaussian heatmaps have scored greater than 0.3 to prevent ambiguity in empty space.

In aspects of the present disclosure, the output heads of the 3D object manipulation architecture 400 also include a keypoint prediction head 470. As described, keypoints may refer to learned correspondences that are a common representation for scene understanding to enable, for example, robot manipulation, especially in deformable manipulation. As shown in FIG. 4, the output heads of the 3D object manipulation architecture 400 include the keypoint prediction head 470 to output the predicted keypoints 472. For example, the predicted keypoints 472 may include t-shirt sleeves for t-shirt folding (see FIG. 5C). In some aspects of the present disclosure, the keypoint prediction head 470 predicts heatmaps for each keypoint class, and is trained to match target heatmaps with Gaussian distributions placed at each ground-truth keypoint location using a pixel-wise cross-entropy loss $l_{kp}$. To extract keypoints from the predicted heatmaps, non-maximum suppression is used to perform peak detection, according to aspects of the present disclosure.

High-Level Predictions: Optional Auxiliary Prediction Heads

In aspects of the present disclosure, the 3D object manipulation architecture 400 also includes two optional auxiliary prediction heads to enable better scene understanding of the world. These prediction heads do not affect performance of the other tasks of the 3D object manipulation architecture 400.

In these aspects of the present disclosure, the output heads of the 3D object manipulation architecture 400 also include a room-level segmentation prediction head 450. For example, the room-level segmentation prediction head 450 can predict a room-level segmentation based on one of three categories. These three categories may include, but are not limited to, surfaces, objects, and background. Cross-entropy loss $l_{seg}$ may be used for training the room-level segmentation prediction head 450 to enable better scene understanding of the world. For example, the room-level segmentation prediction head 450 enables a mobile robot to detect surfaces and objects available for manipulation.

In these aspects of the present disclosure, the output heads of the 3D object manipulation architecture 400 may also include a full-resolution disparity prediction head 480 to predict a full-resolution disparity image 482. For example, because the SCVN 420 produces the low-resolution disparity image 430 at a quarter resolution, the feature extraction backbone 440 can combine the backbone and the left stereo RGB image 402 to produce a full resolution depth image. The same branch architecture as the previous heads is used to aggregate information across different scales of the full-resolution disparity prediction head 480. During training of the full-resolution disparity prediction head 480, the same loss as the SCVN 420 is used, but enforced at full resolution. For example, the full-resolution disparity prediction head 480 is trained using a Huber loss function and is denoted $\ell_d$. According to aspects of the present disclosure, the full-resolution disparity image 482 can be converted into a 3D point cloud for collision avoidance during autonomous agent operation.

Efficient Synthetic Dataset Generation

Figures 5A, 5B, 5C:
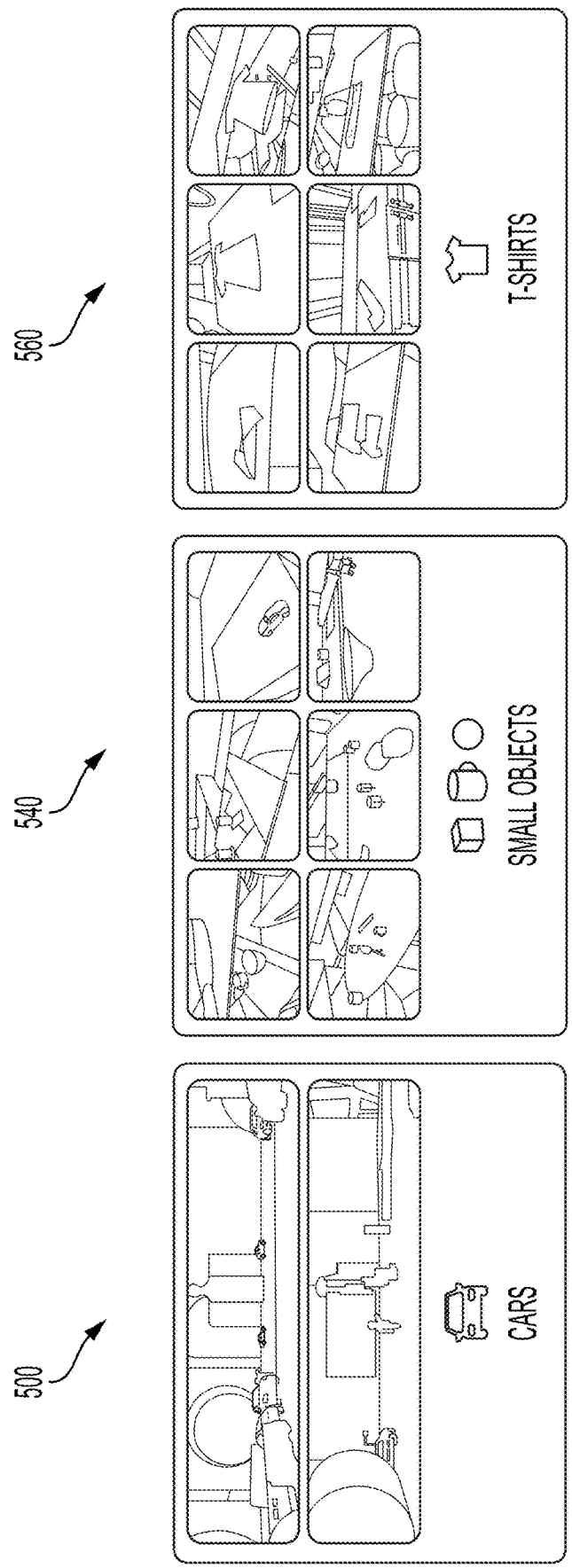
FIGS. 5A-5C illustrate three synthetic datasets generated to train the 3D object manipulation architecture of FIG. 4, according to aspects of the present disclosure.

FIGS. 5A-5C illustrate three synthetic datasets generated to train the 3D object manipulation architecture 400 of FIG. 4, according to aspects of the present disclosure. Given the complexity of the predictions of the output heads of the 3D object manipulation architecture 400, it would be impractical to label a sufficient amount of real data to generalize across scenes. Some aspects of the present disclosure are directed to using synthetic data to provide ground truth annotations on a wide variety of scenarios. To force the networks of the 3D object manipulation architecture 400 to learn geometric features, randomization is performed over lighting and textures. For example, OpenGL shaders with PyRender are used instead of physically based rendering approaches to generate simulation images, for example, as shown in FIGS. 5A-5C. In aspects of the present disclosure, low-quality rendering greatly speeds up computation, and allows for dataset generation on the order of an hour, for example, as shown in FIGS. 5A-5C.

As shown in FIG. 5A-5C, simulation images for three datasets are generated: cars 500 of FIG. 5A, graspable objects (e.g., small objects 540) of FIG. 5B, and t-shirts 560 of FIG. 5C. For example, a non-photorealistic simulator with domain-randomization provides simulated data generated for the three domains of cars 500, small objects 540, and t-shirts 560. Dataset generation is parallelized across machines and can be generated in an hour for, for example, $60 (USD) cloud compute cost. By forcing the networks of the 3D object manipulation architecture 400 to learn geometric features, sim-to-real transfer is performed using only very low-quality scenes, as shown in FIG. 5A-5C.

FIGS. 6A and 6B are block diagrams 600 further illustrating operation of the 3D object manipulation architecture 400 of FIG. 4, according to aspects of the present disclosure. FIG. 6A illustrates the 3D object manipulation architecture 400, which may be referred to as a simulation network (e.g., "SimNet"), and configured to enable training of perception/manipulation models on simulated data to transfer to real-world scenes. In this example, a left stereo RGB image 602 and a right stereo RGB image 604 are fed the 3D object manipulation architecture 400, which may generate oriented bounding boxes (OBBs) 610 of unknown objects (e.g., a stapler and a glass cup) from the left stereo RGB image 602 and the right stereo RGB image 604. For example, as shown in FIG. 4, the OBBs output prediction head 460 outputs the predicted OBBs 462 of an image frame. In some aspects of the present disclosure, grasp positions 620 are produced from the OBBs 610 and are used, for example, by a classical planner to direct the robot 350 of FIG. 3 to grasp the unknown objects, as further illustrated in FIG. 6B.

FIG. 6B is a block diagram illustrating a fleet of robots deployed in home environments to perform manipulation in optically challenging scenarios using grasping techniques, according to aspects of the present disclosure. In the manipulation experiment of FIG. 6B, the task of the robot 350 is to grasp objects on a tabletop comprised of two classes of household objects in each of the four home environments (e.g., 650, 660, 670, and 680). For example, the two classes of objects include: (1) optically easy, which is composed of opaque, non-reflective objects; and (2) optically hard, which is composed of optically challenging, transparent objects. For each trial, an object is selected uniformly at random from the dataset and randomly placed on the tabletop with other distractor objects. The task is to grasp the foremost object in the scene using a heuristic grasp planner that takes the OBBs 610 predict the object grabs. To grasp objects, the robot 350 aligns the gripper with the largest principal axis of the OBBs 610. In the event of similar sized principal axes like a ball, the robot 350 favors grasping the object on the side closest to the robot 350. A grasp is successful if the robot 350 is able to raise the object off the table and remove it from the scene.

Figure 7:
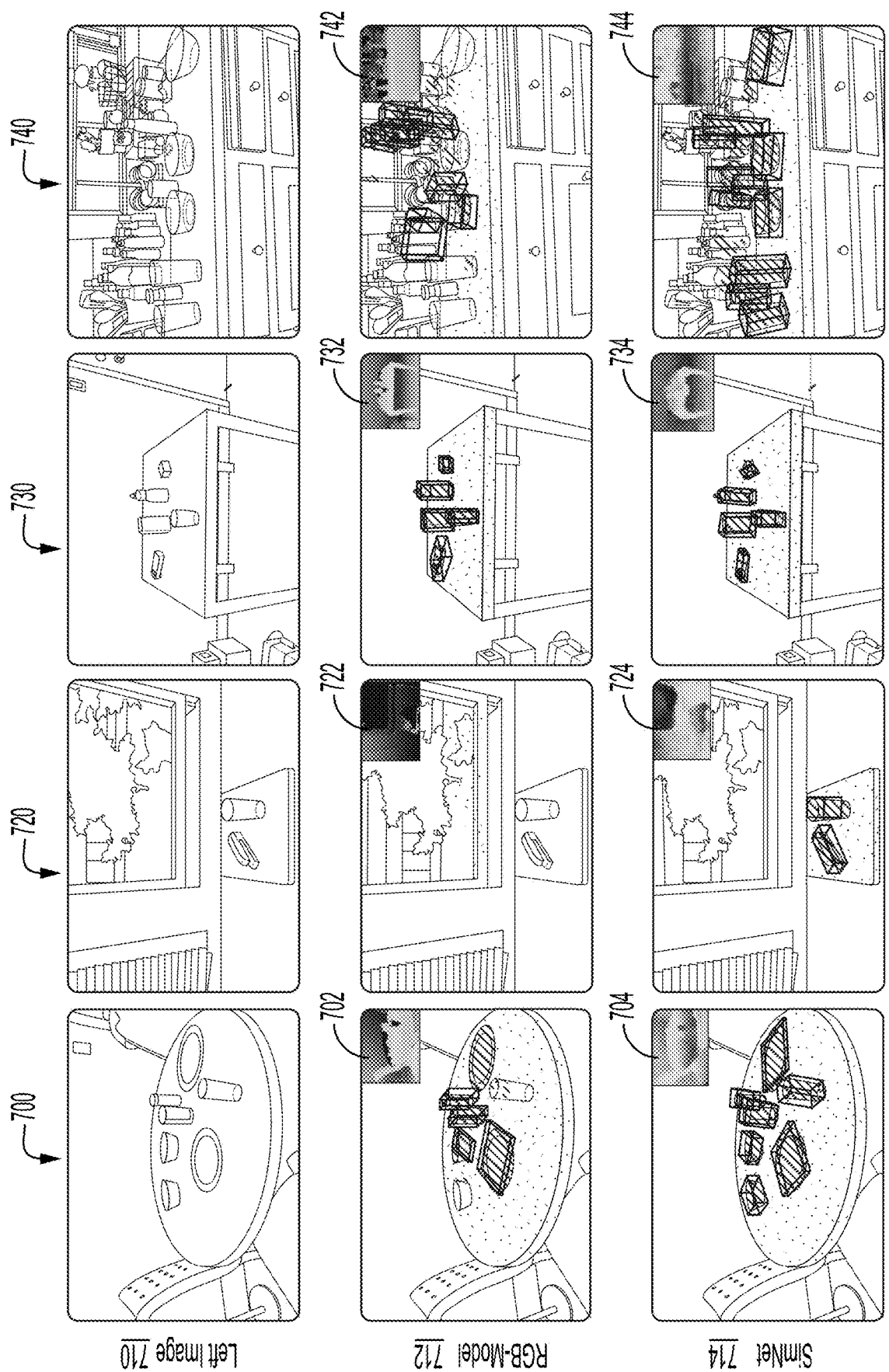
FIG. 7 is a diagram illustrating a layout view of graspable object predictions, according to aspects of the present disclosure.

FIG. 7 is a diagram illustrating a layout view of graspable object predictions, according to aspects of the present disclosure. In this example, the 3D object manipulation architecture 400 of FIG. 4 is evaluated on an oriented bounding box (OBB) regression task with objects of varying sizes and shapes on flat surfaces. FIG. 7 illustrates a left RGB image from different home environments (e.g., 700, 720, 730, and 740) in a first row 710. A middle row 712 illustrates an OBB model prediction trained with RGB depth (RGB-D) data. A top right corner (e.g., 702, 722, 732, and 742) of the OBB model prediction in the middle row 712 is the output of a depth sensor from different home environments.

A bottom row 714 is an OBB prediction output of the 3D object manipulation architecture 400. A top right corner (e.g., 704, 724, 734, and 744) of the bottom row 714 illustrates a low-res disparity estimate. The low-res disparity estimate may be the low-resolution disparity image 430 output from the SCVN 420, as shown in FIG. 4. As illustrated by the OBB model predictions in the bottom row 714, the 3D object manipulation architecture 400 consistently enables better simulation-to-real transfer of the predictions for optically challenging scenarios shown in different home environments (e.g., 700, 720, 730, and 740).

Figure 8:
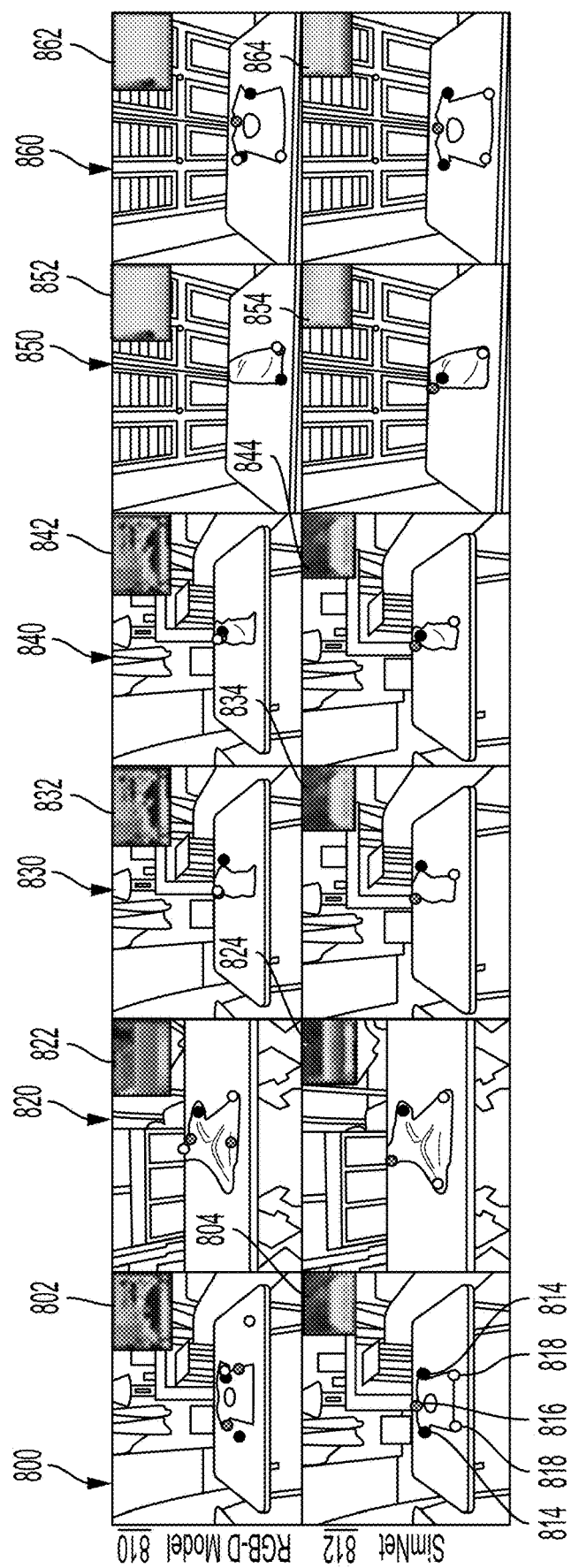
FIG. 8 is a diagram illustrating side views of t-shirt keypoint predictions, according to aspects of the present disclosure.

FIG. 8 is a diagram illustrating side views of t-shirt keypoint predictions, according to aspects of the present disclosure. In this example, the 3D object manipulation architecture 400 of FIG. 4 is evaluated on keypoint regression for t-shirts in various stages (e.g., 800, 820, 830, 840, 850, 860) of folding. For example, three classes of keypoints are predicted: sleeves 814, neck 816, and bottom corners 818. As shown in a first row 810, an RGB-D model performs keypoint regression based on a sensor output (e.g., 802, 822, 832, 842, 852, 862) of a keypoint model prediction. Based on the output keypoint model predictions, the RGB-D model performs poorly and misses some of the sleeves 814, neck 816, and bottom corners 818 keypoints due to strong natural lighting and minimal depth variation based on the different stages (e.g., 800, 820, 830, 840, 850, 860) of folding. By contrast, as shown in the bottom row 812, the 3D object manipulation architecture 400 accurately predicts the keypoints of the sleeves 814, neck 816, and bottom corners 818 on the shirts despite these challenges.

The keypoint regression illustrated in FIG. 7 may be used in a manipulation experiment, in which the robot 350 is evaluated on a t-shirt folding task. In this manipulation experiment, the robot 350 executes a sequence of four folds on unseen, real t-shirts. In practice, this task is challenging to perform using depth sensing, because the depth resolution of most commercial depth sensors cannot capture the subtle variations in depth due to the thickness of a t-shirt. Keypoints are a popular representation for manipulating deformable objects. A t-shirt folding policy is parameterized using keypoint predictions for the t-shirt's neck 816, sleeves 814, and bottom corners 818. Although keypoints are a popular representation for manipulating deformable objects, using the RGB-D model to perform the t-shirt folding task provides less than optimal results relative to the keypoint regression shown in the bottom row 812.

FIGS. 6A, 6B, 7, and 8 illustrate real-world computer vision and robotics experiments performed to evaluate how well the 3D object manipulation architecture 400 can learn from synthetic stereo data and transfer to diverse, real images in unstructured environments. All physical experiments are conducted on tabletops found across four different, real homes. Each home has different background objects, furniture, graspable objects, and lighting conditions, which evaluate each network's ability to robustly generalize to diverse scenarios.

3D Object Manipulation

In these configurations, the oriented bounding boxes (OBBs) are not the final goal but rather a means to an end—namely, 3D object manipulation. As those skilled in the art are aware, once the OBBs output prediction head 460 predicts a 3D label (e.g., an oriented bounding box) for an object, it is a relatively simple matter for the robot perception module 310 of FIG. 3 to perform 3D object manipulation of the object based, at least in part, on graspable object predictions. In aspects of the present disclosure, a robot trajectory module is trained to plan a trajectory of a robot according to the graspable object predictions to enable manipulation of unknown objects in complex environments.

According to aspects of the present disclosure, the 3D object manipulation architecture 400 provides an efficient, multi-headed prediction network that leverages approximate stereo matching to transfer from simulation to reality. The 3D object manipulation architecture 400 may be trained entirely on simulated data and robustly transfers to real images of unknown optically-challenging objects such as glassware, even in direct sunlight. Oriented bounding boxes (OBBs) and graspable object predictions from the 3D object manipulation architecture 400 are sufficient for robot manipulation such as t-shirt folding and grasping. A process for operation of the 3D object manipulation architecture 400 is further illustrated in FIG. 9.

Figure 9:
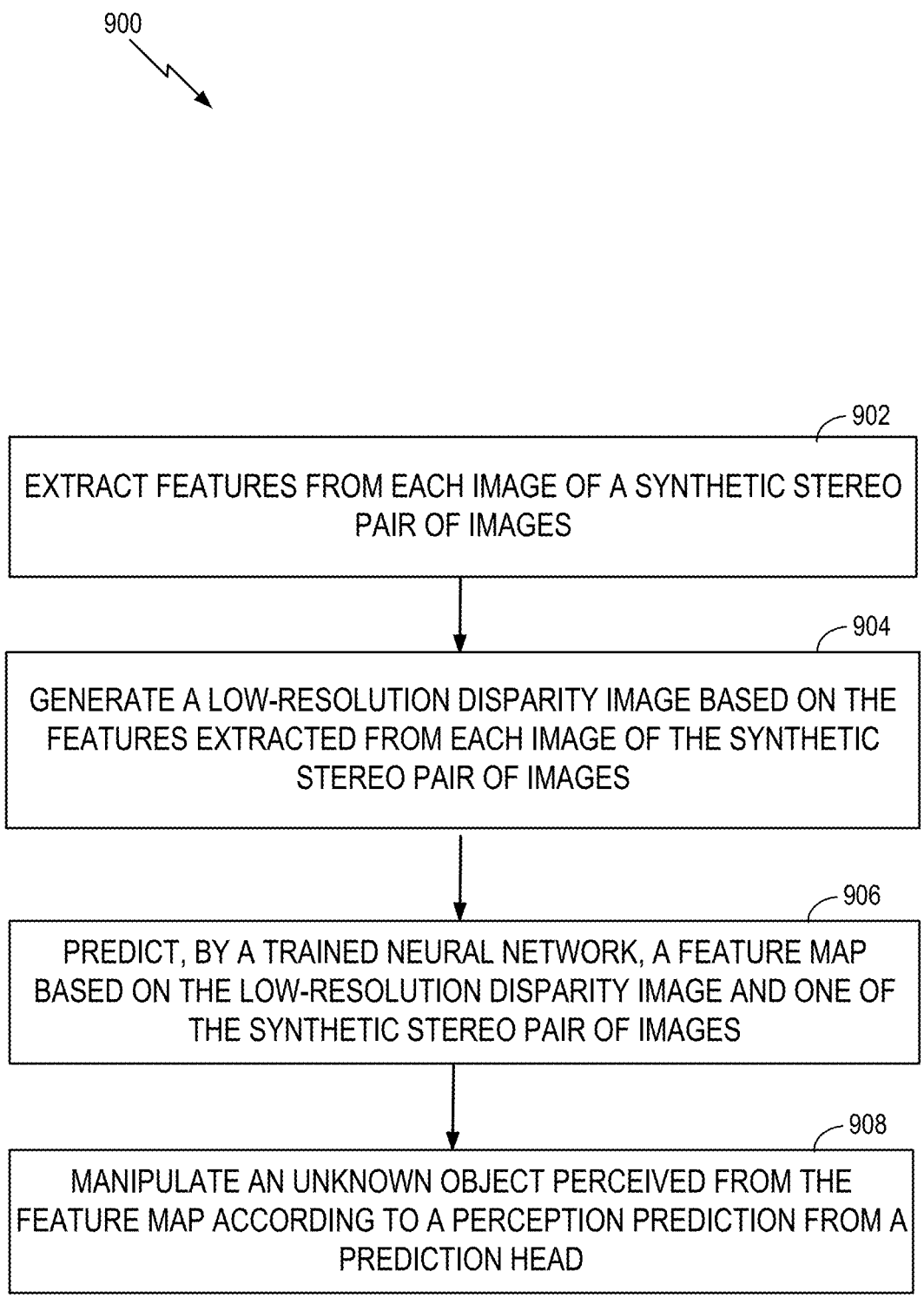
FIG. 9 is a flowchart illustrating a method for 3D object manipulation, according to aspects of the present disclosure.

FIG. 9 is a flowchart illustrating a method for 3D object manipulation, according to aspects of the present disclosure. The method 900 begins at block 902, in which features are extracted from each image of a synthetic stereo pair of images. For example, as shown in FIG. 4, the left stereo RGB image 402 and the right stereo RGB image 404 are fed into the left feature extractor 410 and the right feature extractor 414. Prior to feature extraction, low-cost, non-photorealistic simulation graphics are used for generating the synthetic stereo pair of images (e.g., the left stereo RGB image 402 and the right stereo RGB image 404). In some aspects of the present disclosure, the left feature extractor 410 and the right feature extractor 414 are implemented using neural networks (e.g., $\Phi_l$ and $\Phi_r$) trained to identify features of each image and output feature volumes $\phi_l$ 412 and $\phi_r$ 416.

At block 904, a low-resolution disparity image is generated based on the features extracted from each image of the synthetic stereo pair of images. For example, as shown in FIG. 4, the output feature volumes $\phi_l$ 412 and $\phi_r$ 416 are fed into a stereo cost volume network (SCVN) 420, which performs approximate stereo matching between output feature volumes $\phi_l$ 412 and $\phi_r$ 416. The output of the SCVN 420 is a low-resolution disparity image 430. As shown in FIG. 4, the SCVN 420 is configured to extract geometric features from the left stereo RGB image 402 and the right stereo RGB image 404 to form the low-resolution disparity image 430. Some aspects of the present disclosure learn high-level predictions relevant to vision task (e.g., object detection/manipulation).

At block 906, a trained neural network predicts a feature map based on the low-resolution disparity image and one of the synthetic stereo pair of images. For example, as shown in FIG. 4, these aspects of the present disclosure design a backbone for robust simulation-trained manipulation by feeding the output of the SCVN 420 (e.g., the low-resolution disparity image 430 ($\hat{I}_d$,low)) into the feature extraction backbone 440 (e.g., a residual neural network (ResNet) feature pyramid network (FPN) backbone ($f_{backbone}$). Additionally, early stage features provided by the feature extractor 406 from the left stereo RGB image 402, $I_l$, allow high-resolution texture information to be considered at inference time. The features are extracted from the ResNet stem, concatenated with the low-resolution disparity image 430 output of the SCVN 420, and fed into the feature extraction backbone 440.

At block 908, an unknown object perceived from the feature map is manipulated according to a perception prediction from a prediction head. For example, as shown in FIG. 4, the oriented bounding boxes (OBBs) output prediction head 460 outputs the predicted OBBs 462 of an image frame. Detection of the OBBs may involve determining individual object instances as well as estimating translation, $t \in \mathbb{R}^3$, scale $S \in \mathbb{R}^{3 \times 3}$, and rotation, $R \in \mathbb{R}^{3 \times 3}$, of the predicted OBBs 462. These parameters can be recovered by using the four different output heads of the 3D object manipulation architecture 400. First, to recover object instances, a $W_0 \times H_0$ image is regressed, which is the resolution of the left stereo RGB image 402, and a Gaussian heatmap is predicted for each object in the $W_0 \times H_0$ image. Instances can then be derived using peak detection. In addition, an $L_1$ loss is used on the OBBs output prediction head 460, in which the loss is denoted as $l_{inst}$. For example, as shown in FIG. 6A, grasp positions 620 (e.g., graspable object predictions) are produced from the OBBs 610 and are used, for example, by a classical planner to direct the robot 350 to grasp unknown objects, such as glass cups on a flat surface.

The method 900 may include generating, by the prediction head, oriented bounding box (OBB) predictions based on the feature map. The method 900 may also include producing grasp positions according to the OBB predictions. The method 900 may further include grasping the unknown object based on the grasp positions. The method 900 may also include generating non-photorealistic simulation graphics. The method 900 may further include generating the synthetic stereo pair of images from the non-photorealistic simulation graphics to provide a left image and a right image as the synthetic stereo pair of images. The method 900 may also include generating a segmentation image based on the feature map. The method 900 may further include detecting keypoints of objects in the synthetic stereo pair of images detected from the feature map. The method 900 may also include planning an object grasp by a robot according to object grasp predictions from video captured by the robot. The method 900 may also include generating a full resolution disparity image from the synthetic stereo pair of images based on the feature map.

In some aspects of the present disclosure, the method 900 may be performed by the SOC 100 (FIG. 1) or the software architecture 200 (FIG. 2) of the robot 150 (FIG. 1). That is, each of the elements of method 900 may, for example, but without limitation, be performed by the SOC 100, the software architecture 200, or the processor (e.g., CPU 102) and/or other components included therein of the robot 150.

Robot manipulation of unknown objects in unstructured environments is a challenging problem due to the variety of shapes, materials, arrangements and lighting conditions. Even with large-scale real-world data collection, robust perception and manipulation of transparent and reflective objects across various lighting conditions remain challenging. Some aspects of the present disclosure address these challenges by providing an approach to performing simulation to real (sim-to-real) transfer of robotic perception. In some aspects of the present disclosure, an underlying model is trained as a single multi-headed neural network using simulated stereo data as input and simulated object segmentation masks, 3D oriented bounding boxes (OBBs), object keypoints, and disparity as outputs.

One component of a 3D object manipulation model is the incorporation of a learned stereo sub-network that predicts disparity. For example, when the 3D object manipulation model is evaluated on unknown object detection and deformable object keypoint detection, the 3D object manipulation model significantly outperforms a baseline that uses structured light red-green-blue (RGB) depth (RGB-D) sensors. By inferring grasp positions using the OBB and keypoint predictions, the 3D object manipulation model may be used to perform end-to-end manipulation of unknown objects across a fleet of robots. In object grasping experiments, the 3D object manipulation model significantly outperforms the RGB-D baseline on optically challenging objects, suggesting that 3D object manipulation can enable robust manipulation of unknown objects, including transparent objects, in novel environments.

Aspects of the present disclosure may provide three contributions: (i) an efficient neural network for sim-to-real transfer that uses learned stereo matching to enable robust sim-to-real transfer of "high-level" vision tasks, such as keypoints and oriented bounding boxes (OBBs), (ii) the first network to enable direct prediction of 3D OBBs of unknown objects, and (iii) an indoor scenes dataset with 3D OBBs labels of common household objects, corresponding stereo and RGB-D images, and training code for a 3D object manipulation model.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more PGAs, PLDs, controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for training a neural network to perform 3D object manipulation, the method comprising:
    extracting features from each image of a synthetic stereo pair of images;
    generating a low-resolution disparity image based on the features extracted from each image of the synthetic stereo pair of images;
    generating, by the neural network, a feature map based on the low-resolution disparity image and features extracted from a single one of the synthetic stereo pair of images; and
    manipulating an unknown object perceived from the feature map according to a perception prediction from a prediction head.

2. The method of claim 1, in which manipulating comprises:
    generating, by the prediction head, oriented bounding box (OBB) predictions based on the feature map;
    producing grasp positions according to the OBB predictions; and
    grasping the unknown object based on the grasp positions.

3. The method of claim 1, further comprising:
    generating non-photorealistic simulation graphics; and
    generating the synthetic stereo pair of images from the non-photorealistic simulation graphics to provide a left image and a right image as the synthetic stereo pair of images.

4. The method of claim 1, further comprising generating a segmentation image based on the feature map.

5. The method of claim 1, further comprising detecting keypoints of objects in the synthetic stereo pair of images detected from the feature map.

6. The method of claim 1, further comprising generating a full resolution disparity image from the synthetic stereo pair of images based on the feature map.

7. The method of claim 1, further comprising planning the manipulating of the unknown object by a robot according to the perception prediction from the prediction head.

8. The method of claim 1, further comprising planning an object grasp by a robot according to object grasp predictions from video captured by the robot.

9. A non-transitory computer-readable medium having program code recorded thereon for training a neural network to perform 3D object manipulation, the program code being executed by a processor and comprising:
    program code to extract features from each image of a synthetic stereo pair of images;
    program code to generate a low-resolution disparity image based on the features extracted from each image of the synthetic stereo pair of images;
    program code to generate a feature map based on the low-resolution disparity image and features extracted from a single one of the synthetic stereo pair of images using the neural network; and
    program code to manipulate an unknown object perceived from the feature map according to a perception prediction from a prediction head.

10. The non-transitory computer-readable medium of claim 9, in which the program code to manipulate comprises:
    program code to generate, by the prediction head, oriented bounding box (OBB) predictions based on the feature map;
    program code to produce grasp positions according to the OBB predictions; and
    program code to grasp the unknown object based on the grasp positions.

11. The non-transitory computer-readable medium of claim 9, further comprising:
    program code to generate non-photorealistic simulation graphics; and
    program code to generate the synthetic stereo pair of images from the non-photorealistic simulation graphics to provide a left image and a right image as the synthetic stereo pair of images.

12. The non-transitory computer-readable medium of claim 9, further comprising program code to generate a segmentation image based on the feature map.

13. The non-transitory computer-readable medium of claim 9, further comprising program code to detect keypoints of objects in the synthetic stereo pair of images detected from the feature map.

14. The non-transitory computer-readable medium of claim 9, further comprising program code to generate a full resolution disparity image from the synthetic stereo pair of images based on the feature map.

15. The non-transitory computer-readable medium of claim 9, further comprising program code to plan the manipulating of the unknown object by a robot according to the perception prediction from the prediction head.

16. The non-transitory computer-readable medium of claim 9, further comprising program code to plan an object grasp by a robot according to object grasp predictions from video captured by the robot.

17. A system for training a neural network to perform 3D object manipulation, the system comprising:
    a stereo feature extraction module to extract features from each image of a synthetic stereo pair of images;
    a disparity image generation module to generate a low-resolution disparity image based on the features extracted from each image of the synthetic stereo pair of images;
    a feature map generation module to generate a feature map based on the low-resolution disparity image and features extracted from a single one of the synthetic stereo pair of images using the neural network; and
    a 3D object manipulation module to manipulate an unknown object perceived from the feature map according to a perception prediction from a prediction head.

18. The system of claim 17, in which the 3D object manipulation module is further to generate, by the prediction head, oriented bounding box (OBB) predictions based on the feature map, to produce grasp positions according to the OBB predictions, and to grasp the unknown object based on the grasp positions.

19. The system of claim 17, further to a planner module to plan the manipulating of the unknown object by a robot according to the perception prediction from the prediction head.

20. The system of claim 17, further to a planner module to plan an object grasp by a robot according to object grasp predictions from video captured by the robot.

* * * * *